US012603446B2

(12) United States Patent
Schumacher et al.

(10) Patent No.: US 12,603,446 B2
(45) Date of Patent: Apr. 14, 2026

(54) CONNECTOR DEVICE AND CONNECTION UNIT

(71) Applicant: Weidmüller Interface GmbH & Co. KG, Detmold (DE)

(72) Inventors: Ralf Schumacher, Lemgo (DE); Torsten Diekmann, Leopoldshöhe (DE); Christopher Smith, Steinhagen (DE); Matthias Niggemann, Dörentrup (DE); Jens Oesterhaus, Detmold (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 476 days.

(21) Appl. No.: 18/169,956

(22) Filed: Feb. 16, 2023

(65) Prior Publication Data

US 2023/0268680 A1 Aug. 24, 2023

(30) Foreign Application Priority Data

Feb. 18, 2022 (DE) ..................... 10 2022 103 851.3

(51) Int. Cl.

| | |
|---|---|
| ***H01R 12/71*** | (2011.01) |
| ***H01R 12/72*** | (2011.01) |
| ***H01R 12/79*** | (2011.01) |
| ***H01R 13/15*** | (2006.01) |
| ***H01R 13/40*** | (2006.01) |

(52) U.S. Cl.

CPC ......... *H01R 12/714* (2013.01); *H01R 12/721* (2013.01); *H01R 12/79* (2013.01); *H01R 13/15* (2013.01); *H01R 13/40* (2013.01)

(58) Field of Classification Search

CPC .... H01R 12/714; H01R 12/515; H01R 12/57; H01R 12/721; H01R 12/79; H01R 13/15; H01R 13/40; H01R 4/48

USPC ........................................................... 439/66

See application file for complete search history.

(56) References Cited

U.S. PATENT DOCUMENTS

| | | | | |
|---|---|---|---|---|
| 9,106,005 | B2 | 8/2015 | Okuyama et al. | |
| 10,153,564 | B1 | 12/2018 | Wu | |
| 2011/0207372 | A1 | 8/2011 | Breen, IV | |
| 2016/0248174 | A1 * | 8/2016 | Ludewig | H01R 9/223 |

FOREIGN PATENT DOCUMENTS

| | | | | |
|---|---|---|---|---|
| CN | 209150333 | U | 7/2019 | |
| DE | 102004022791 | A1 * | 12/2005 | H01R 12/58 |
| DE | 102017115654 | A1 | 2/2018 | |
| EP | 0735616 | A2 * | 10/1996 | H01R 4/4821 |

OTHER PUBLICATIONS

English translation of DE-102004022791-A1 (Year: 2004).*
English translation of EP-0735616-A2 (Year: 1996).*

* cited by examiner

*Primary Examiner* — Abdullah A Riyami
*Assistant Examiner* — Amara Anderson
(74) *Attorney, Agent, or Firm* — LAUBSCHER & FRETWELL, P.C.

(57) ABSTRACT

A connector device for connecting at least one electrical conductor to at least one electrically conducting contact face of a circuit board includes a housing, at least one first connection unit and at least one second connection unit. The connector device has a SMD-capable contact geometry. The SMD-capable contact geometry has at least one first circuit board contact and at least one second circuit board contact with one spring arm having a respective contact projection.

16 Claims, 8 Drawing Sheets

CONNECTOR DEVICE AND CONNECTION UNIT

This application claims priority of DE 10 2022 103 951.3 filed Feb. 18, 2002. The entire content of this application is incorporated herein by reference.

BACKGROUND OF THE INVENTION

The invention relates to a connector device and to a connection unit of such a connector device.

Such a connector device is used to connect an electrical conductor to a circuit board. The connector device includes a connection unit to which, on one hand, the electrical conductor can be connected, e.g. by a clip, and which, on the other hand, has a suitable connection possibility for contact faces of the circuit board, e.g. spring contacts. The contact faces of the circuit board are normally formed of copper. They can also be tin-plated, silver-plated or gold-plated.

In the course of a miniaturization of the components with which the circuit board is fitted, what are known as SMD (Surface Mounted Devices) components of a small size are used which are placed onto the associated copper surfaces (SMD solder pads) prepared for SMD soldering processes (e.g. infrared, hot air, vapor phase, and the like), possibly fastened with adhesives, and then soldered onto the associated SMD solder pads with the suitable SMD soldering processes.

A continuously increasing demand for connector devices, e.g. in automation sectors, for various conductors on circuit boards, in particular circuit boards, in the SMD field gives rise to a requirement for improved connector devices in terms of soldering capacity by the SMD soldering process, compact design and reliable and simple handling.

The object of the present invention is therefore to create an improved connector device for conductors on SMD-fitted circuit boards.

A further object is to provide an improved connector device.

SUMMARY OF THE INVENTION

A connector device according to the invention for connecting at least one electrical conductor to at least one electrically conducting contact face of a circuit board includes a housing, at least one first connection unit and at least one second connection unit, wherein the connector device has an SMD-capable contact geometry. The SMD-capable contact geometry has at least one first circuit board contact and at least one second circuit board contact with in each case one spring arm with a respective contact projection.

One particular advantage of the SMD-capable contact geometry lies in the fact that the connector device, on one hand, can easily be pushed with the circuit board contacts onto the contact faces of the circuit board. On the other hand, the contact projections advantageously make it possible to abide by a required soldering gap between the contact faces of the circuit board and the respective spring arm of the circuit board contacts.

The term circuit board also includes circuit boards laminated on one side, circuit boards laminated on two sides, multilayer-circuit boards, circuit boards with a metal core, flexible circuit boards and the like.

A connection unit according to the invention of the connector device described above for connecting at least one electrical conductor to at least one electrically conducting contact face of a circuit board, a spring clip and a circuit board contact has a base plate with a first side wall and with a second side wall, wherein the first side wall and the second side wall are attached parallel to one another and at a right angle to the base plate and are connected in an electrically conducting manner through the base plate. This results in the advantage of a compact and simple structure. The base plate is furthermore stiffened by the side walls.

In one embodiment, the contact projections form in each case a point contact. This results in the particular advantage over conventional line contacts that the flux or solder paste located on the contact faces is neither removed nor pushed away or reduced, apart from in the region of the contact projections.

Alternatively, the contact projections can form in each case a line contact which extends in the plugging direction of the connector device. The line contact can be continuous or interrupted wherein it is composed of several partial line pieces. Several point contacts can also be provided consecutively in a row extending in the plugging direction of the connector device as a contact projection. A combination of point/line contacts is also possible. These embodiments all result in the advantage that the flux or solder paste located on the contact faces is only pushed away or reduced in the region of the contact projections, wherein the remaining contact face remains covered with flux or solder paste.

In a further embodiment, the at least one first circuit board contact with the one contact projection and the at least one second circuit board contact with the one contact projection are arranged opposite one another, wherein between them they define a connector space for receiving a connector region of the circuit board to be attached. The connector device does not have to be positioned on a circuit board side like the other SMD components; rather it can be pushed-on or plugged-on on an edge of the circuit board.

It is advantageous that the connector space is furthermore defined by a central web of the housing of the connector device since a stop for the positioning of the connector device on the circuit board is thus enabled.

A yet further embodiment provides that the at least one first connection unit and the at least one second connection unit are inserted in each case in a receptacle of the housing, wherein each receptacle has at least one first opening on an upper side of the housing for the at least one electrical conductor and at least one second opening through which the spring arm of the respective circuit board contact extends, on an under side of the housing. The connection units in the connector device are thus advantageously arranged in the correct position in accordance with a used contact space of the contact faces of the circuit board in a manner such that they are insulated from one another.

In a further embodiment, the spring arm of the first circuit board contact is attached to a first side wall of the at least one first connection unit, and the spring arm of the second circuit board contact is attached to a second side wall of the at least one second connection unit. In this manner, a basic structure of the connection unit can advantageously be used for both connection units, wherein the receptacles of the connector device can be formed to be identical.

In a yet further embodiment, the at least one first connection unit and the at least one second connection unit are arranged in adjacent receptacles in such a manner that a central web of the housing of the connector device is arranged between the first side wall of the at least one first connection unit with the spring arm of the first circuit board contact and the second side wall with the at least one second connection unit to the spring arm of the second circuit board contact. In this manner, the advantage arises of a compact structure, wherein the circuit board contacts are simultaneously arranged under the central web of the connector device.

One embodiment provides that the at least one first connection unit and the at least one second connection unit have in each case a base plate with the first side wall and with the second side wall, wherein the first side wall and the second side wall are attached parallel to one another and at a right angle to the base plate and are connected in an electrically conducting manner through the base plate. For this purpose, the connection units can be advantageously produced as punched/bent parts.

In a further embodiment, the at least one first connection unit and the at least one second connection unit have in each case a spring clip for connecting the at least one conductor, wherein the spring clip includes a spring arm with a contact edge and a contact wall, wherein the contact wall is the second side wall. One advantage lies in the fact that the spring clip can in this manner be integrated with a compact structure in the respective connection unit.

It is advantageous if the spring arm of the spring clip is connected via a curved portion to a fastening portion, which is attached to the first side wall of the base plate in an electrically conducting manner, since only a few components are thus required.

For advantageous handling during connection of the electrical conductors, the housing has an actuator and/or an actuating duct for a tool for actuating the spring clip of a respective connection unit.

One embodiment of the connection unit provides that the spring clip includes a spring arm with a contact edge and a contact wall, wherein the contact wall is the second side wall, and wherein the spring arm of the spring clip is connected via a curved portion to a fastening portion, which is attached to the first side wall of the base plate in an electrically conducting manner. This results in a compact structure with a small number of parts.

In a further embodiment of the one connection unit, the spring arm of the circuit board contact is attached to the first side wall of the connection unit, as a result of which the first side wall is lengthened by the circuit board contact below the spring clip. This is advantageous because the basic structure of the connection unit can be maintained for the one connection unit and the other connection unit. The spring arm of the circuit board contact is attached to the second side wall of the connection unit, as a result of which the second side wall is lengthened by the circuit board contact below the spring clip.

A yet further embodiment of the connection unit provides that the circuit board contacts of the connection units are designed with cranked or bent contact portions. This has the advantage that the connector space can be arranged so that the upper side of the circuit board lies under the shoulder of the central web of the housing of the connector device.

One advantage of the connector device lies in the fact that it is compact and easy to handle. Rapid assembly is furthermore enabled.

BRIEF DESCRIPTION OF THE FIGURES

Exemplary embodiments of the invention will be described below on the basis of the accompanying drawing figures. These exemplary embodiments only serve to illustrate the invention on the basis of preferred constructions, which, however, do not represent the invention in a conclusive manner. In this regard, other exemplary embodiments as well as modifications and equivalents of the represented exemplary embodiments can also be obtained. In the drawing.

DETAILED DESCRIPTION

Figure 1:
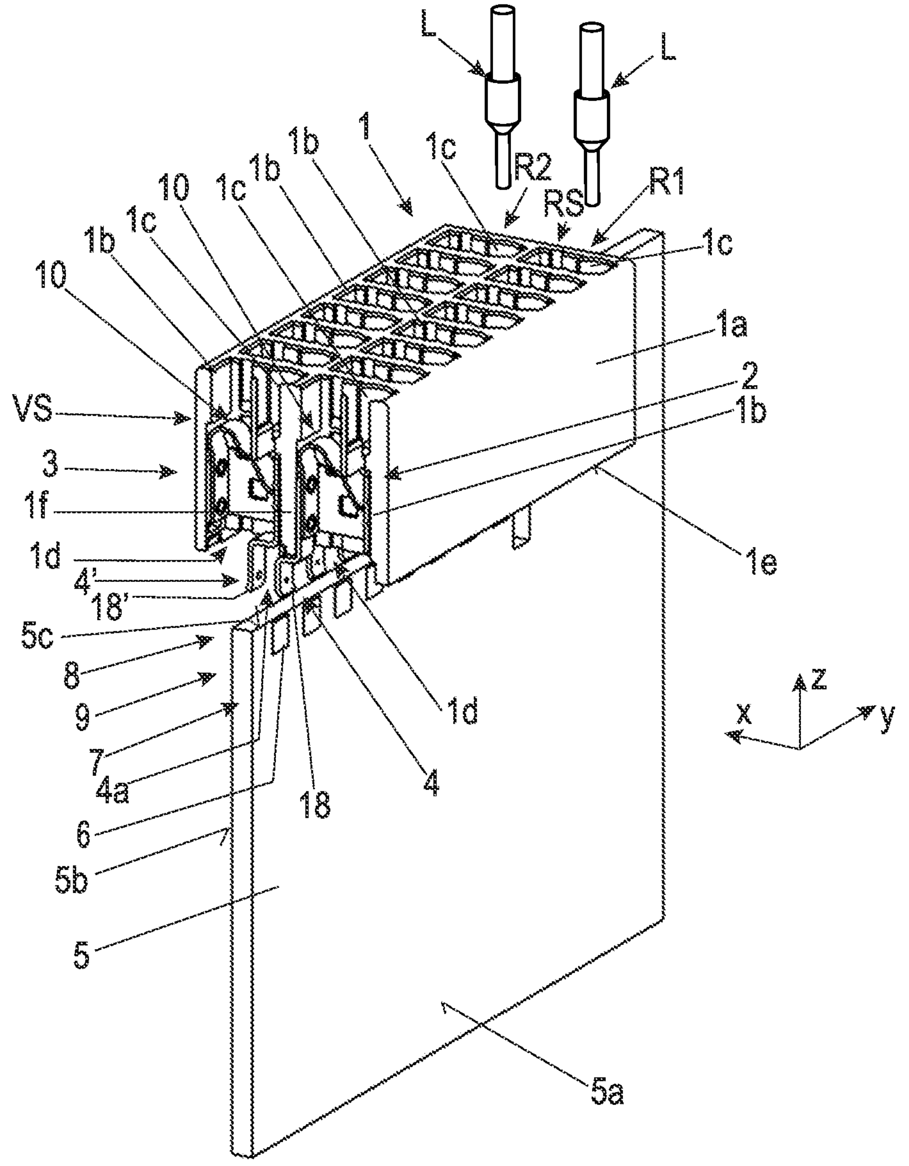
FIG. 1 is a perspective view of an exemplary embodiment of a connector device according to the invention.

Coordinates x, y, z as shown in the drawing serve the purpose of orientation. The terms “upper side”, “lower side”, “laterally” and the like relate to the respective arrangement in the respective drawing figure.

The term “electrically conducting contact” refers to metal surface contacts such as, for example, contact surfaces on circuit boards/conductor foils, metal surface contacts on metal parts such as, for example, housings, coverings, cooling plates, and the like.

FIG. 1 is perspective view of an exemplary embodiment of a connector device 1 according to the invention and an associated, exemplary circuit board 5.

The circuit board 5 is provided for fitting with SMD (Surface Mounted Devices) components on one or both circuit board sides 5*a*, 5*b*. For this purpose, the circuit board has corresponding SMD solder pads to which SMD components are connected by means of SMD soldering processes in an electrically conducting manner.

The connector device 1 serves the purpose of electrically conducting connection of electrical conductors L to contact faces 6 of the conductor plate 5 and has for this purpose a contact geometry of circuit board contacts 4, 4' which is suitable for SMD soldering processes. This contact geometry is described in further detail further.

The connector device 1 is pushed onto a connector region 9 of the circuit board 5. The connector region 9 provides contact arrangements 7, 8 in the form of the contact faces 6 of the circuit board 5. The circuit board contacts 4, 4' and the contact faces 6 of the circuit board 5 are then connected to one another in an electrically conducting manner in one or more SMD soldering processes.

The contact faces 6 of the circuit board 5 are in this case copper surface portions of the circuit board 5. In the example shown, the contact faces 6 are formed as SMD solder pads.

The circuit board 5 shown in FIG. 1 has the connector region 9 with two rows of contact arrangements 7, 8 with the contact faces 6 on both sides 5*a*, 5*b* of the circuit board 5 below an upper side 5*c* of an edge of the circuit board 5. The contact faces 6 are arranged in a previously specified spacing in the y-direction. It is also possible that only one row of contact arrangements 7 or 8 is provided. The contact faces 6 are rectangular in this example, but can also have other geometrical forms.

The connector device 1 includes a housing 1*a* and at least one connection unit 2, 3. The housing 1*a* has two parallel side walls in each case along a y-z-plane which are connected in each case on the face to a front side wall VS and a rear side wall RS which lies in each case in parallel x-z-planes.

Receptacles 1*b* are formed in the housing 1*a*. In the example shown, two parallel connector rows R1 and R2 of eight receptacles 1*b* are arranged in the housing 1*a*. The two connector rows R1 and R2 run in the y-direction and are separated from one another by a central web 1*f* which lies along a y-z-plane parallel to the side walls. In the y-direction. The receptacles 1*b* are separated in each case by walls which run parallel to the front side wall VS and the rear side wall RS. The front side wall VS and the rear side wall RS form the outer walls of the receptacles 1*b*, wherein in this case the front side wall VS is not shown as a result of the cross-sectional view of the two front receptacles 1*b*. While eight receptacles are shown in each row, it will be appreciated that any number of receptacles may be provided.

In each case, one connection unit 2, 3 is inserted in each receptacle 1*b* of the two connector rows R1, R2.

The receptacles 1*b* simultaneously form an electrical insulation of the connection units 2 from one another.

Each connection unit 2, 3 connects a conductor L connected to it by circuit board contacts 4, 4' in an electrically conducting manner to an electrically conducting contact face 6 of the conductor plate 5.

The conductors L are pushed through first openings 1*c* of an upper side of the connector device 1 into a respective connection unit 2, 3 and clamped in an electrically conducting manner therein by a spring clip 10. The spring clip 10 can be actuated with an actuator 1*h* (see FIG. 8). The spring clip 10 is described in detail below.

The connection of the respective connection unit 2, 3 to the respective contact face 6 of the circuit board 5 is produced by a respective circuit board contact 4, 4'. The respective circuit board contact 4, 4' is connected to a respective connection unit 2, 3 in an electrically conducting manner. The respective circuit board contact 4, 4' has a respective contact spring 18, 18' which projects downwardly through a second opening 1*d* on a lower side 1*e* of the housing 1*a*, i.e. in the negative z-direction. The connection units 2, 3 differ from one another as a function of the arrangement of the respective circuit board contact 4, 4'.

The circuit board contacts 4, 4' are arranged such that they are opposite one another in the installed state of the connection units 2, 3 below the central web 1*f*, wherein a connector space 4*a* is formed between them for receiving the connector region 9 of the circuit board 5 with the contact arrangements 7, 8.

The structure of the circuit board contacts 4, 4' will be explained in greater detail below.

First connection units 2 are thus arranged in the first connector row R1 of the connector device 1 and second connection units 3 are thus arranged in the second connector row R2 of the connector device 1.

In FIG. 1, the connector device 1 is not yet pushed or plugged onto the contact faces 6 of the circuit board 5. In the mounted state of the connector device 1, which is also referred to as the connection position, the contact faces 6 of the circuit board 5 are connected to the circuit board contacts 4, 4' of the connector device 1 and are soldered to one another. For this purpose, the circuit board contacts 4, 4' of the connector device 1 are provided for SMD mounting and soldering as will be described in greater detail below.

Figure 2:
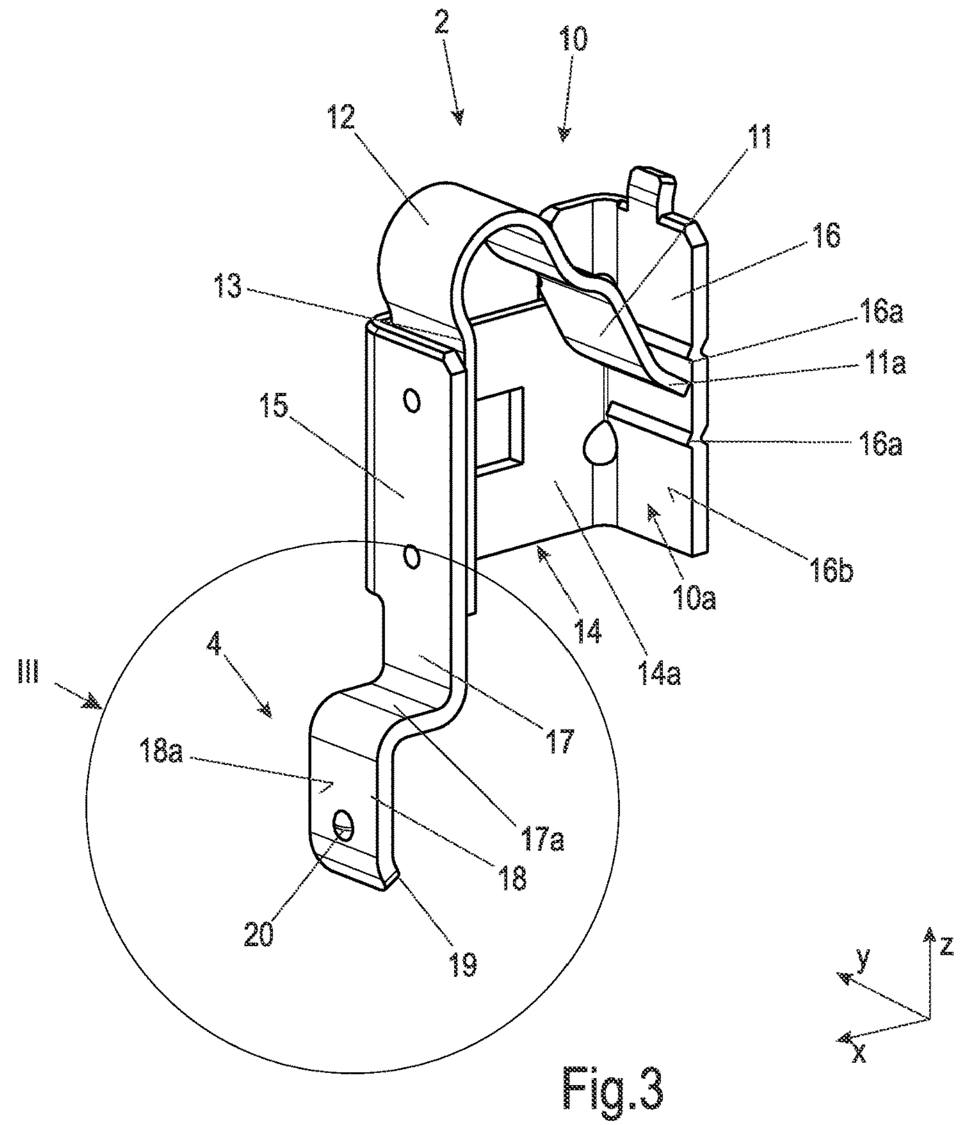
FIG. 2 is a front perspective view of a first connection unit of the connector device of FIG. 1.
Figure 3:
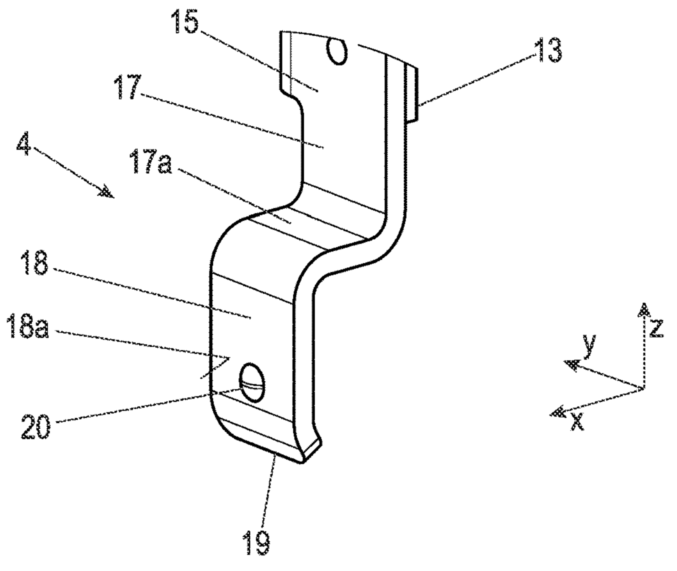
FIG. 3 is a detailed view of a portion of the connection unit of FIG. 2 taken along line III.

FIG. 2 represents a perspective view of the first connection unit 2 according to the invention of the connector device 1 according to FIG. 1. FIG. 3 shows an enlarged perspective view of a circuit board contact 4 of the first connection unit 2 of the connector device 1 of region III of FIG. 1. A further schematic perspective view of the connection unit 2 according to FIG. 2 is shown from a different perspective in FIG. 4.

The connection unit 2 includes the circuit board contact 4, the spring clip 10 and a base plate 14.

The circuit board contact 4 and the spring clip 10 are attached to the electrically conducting base plate 14. In the embodiment shown, the circuit board contact 4 is formed in one piece with the base plate 14. The spring clip 10 is constructed from a separate spring portion and a contact wall 16 formed in one piece with the base plate 14. This is described in more detail below.

The base plate 14 is substantially rectangular and lies in an x-z-plane. In each case a side wall 15, 16 lying in a y-z-plane is arranged on opposite edges of the base plate 14 which run in the z-direction. These side walls 15, 16 are formed by turning the associated side portions of the base plate 14 around by 90°.

The first side wall 15, which is arranged in FIG. 2 on the left edge of the base plate 14, forms a fastening wall for the spring clip 10 and simultaneously an attachment of the first circuit board contact 4. A lower region of the first side wall 15 is connected via connection portions 17, 17*a* to the first contact spring 18. The first circuit board contact 4 is, in this example, formed in one piece with the first side wall 15 and via this in one piece with the base plate 14. In other words, the first sidewall 15 is lengthened by the first circuit board contact 4 in the negative z-direction below the spring clip 10.

The first connection portion 17 lies in the same y-z-plane as the first side wall 15 and is bent at its lower end by 90° into the x-y-plane as a second connection portion 17*a*. The second connection portion 17*a* runs in the positive x-direction. The contact spring 18 is attached to the free end of the second connection portion 17*a*, the lower free end of this contact spring 18 being bent into a short end portion 19 which points in the negative x-direction.

The transitions of the first connection portion 17 to the second connection portion 17*a* and of the second connection portion 17*a* to the contact spring 18 run in each case in a curve.

The contact spring 18 has a contact side 18*a* which runs substantially parallel to the first side wall 15 and points in the positive x-direction. A contact projection 20 is attached in a lower region of the contact spring 18, which contact projection 20 projects from the contact side 18*a*. The contact projection 20 forms a point contact. The contact projection is preferably formed here in a nipple-like manner.

In an embodiment which is not shown but can easily be imagined, a line contact can also be used as the contact projection 20. Such a line contact extends in the z-direction. The line contact can be continuous or interrupted, being composed of several partial line pieces. Several point contacts can also be arranged consecutively in a row extending in the z-direction as contact projection 20, 20'. A combination of point/line contacts is also possible. These formations are not shown, but are readily apparent to a person of ordinary skill in the art.

The second side wall which is opposite the first side wall 15 and runs parallel to it forms a contact wall 16 of the spring clip 10.

In one embodiment which is not shown, the base plate 14 is not shaped as a substantially square plate, but rather has a narrow transverse plate which connects the side walls 15 and 16 in the upper or lower half of the base plate shape shown in FIG. 2.

The first circuit board contact 4 is shown in an enlarged form in FIG. 3. The first circuit board contact 4 is designed with the connection portions 17, 17*a* bent in relation to the first side wall 15.

Both the circuit board contact 4 and the base plate 14 with the side walls 15 and 16 can be produced as a punched/bent part.

The spring clip 10 includes a spring arm 11 with an end portion with a contact edge 11*a*, a curved portion 12, a fastening portion 13 and the second side wall 16 as a contact wall.

The spring arm 11 is formed with several inverse curves and connected via the curved portion 12 to the fastening portion 13.

The fastening portion 13 runs in a straight line parallel in the z-direction in electrically conducting contact with the first side wall 15 of the base plate 14 and is fastened to the first side wall 15 for example with rivets. Other fastenings are of course possible.

The curved portion 12 adjoins the upper end of the fastening portion 13, which curved portion 12 has, in the state shown in FIG. 2 installed into the base plate 14, an angle of approximately 180° and is taut in this case. The spring arm 11 is pushed in this manner with its contact edge 11*a* against a contact side 16*b*, pointing towards the first side wall 15, of the second side wall 16 with pretensioning of the curved portion 12 and the spring arm 11 with its curves.

The contact side 16*b* of the contact wall 16 furthermore has elongate contact projections 16*a*. In the example shown, there are two contact projections 16*a* which extend in the y-direction. In the position of the spring clip shown in FIG. 2 without the clamped conductors, the contact edge 11*a* of the end portion bears between and parallel to the contact projections 16*a* in the y-direction against the contact side 16*b*.

An inner face of the base plate 14 and the contact side 16*b* of the second side wall 16 of the base plate 14 form a connector space 10*a* for a conductor 6 to be clamped in the spring clip 10.

Figure 4:
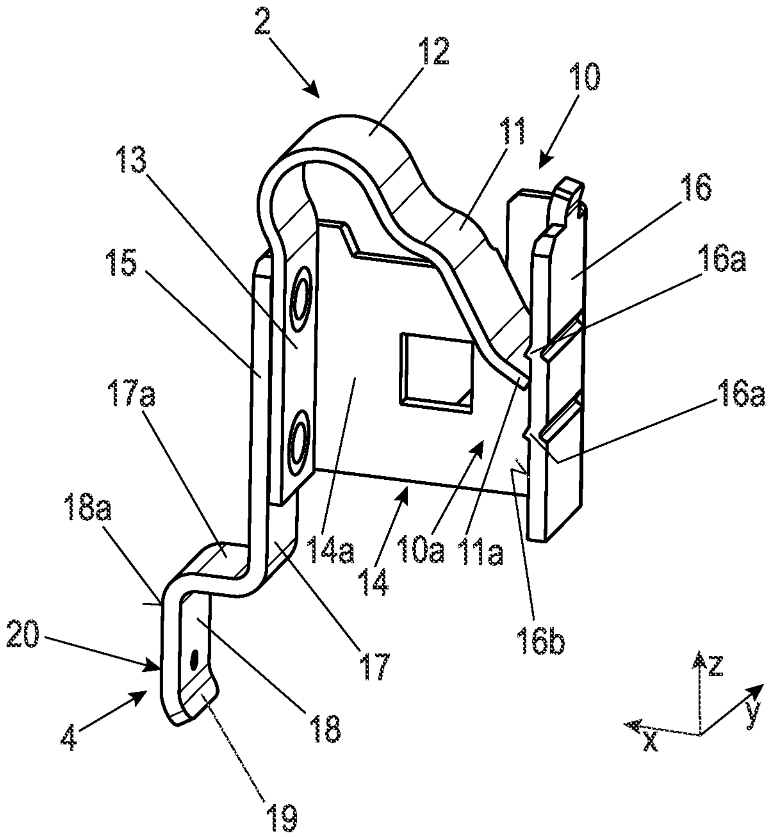
FIG. 4 is a rear perspective view of the first connection unit shown in FIG. 2.

FIG. 4 shows the connection unit 2 according to FIG. 2 from a different perspective with a view of the fastening portion 13 on the first side wall 15.

Figure 5:
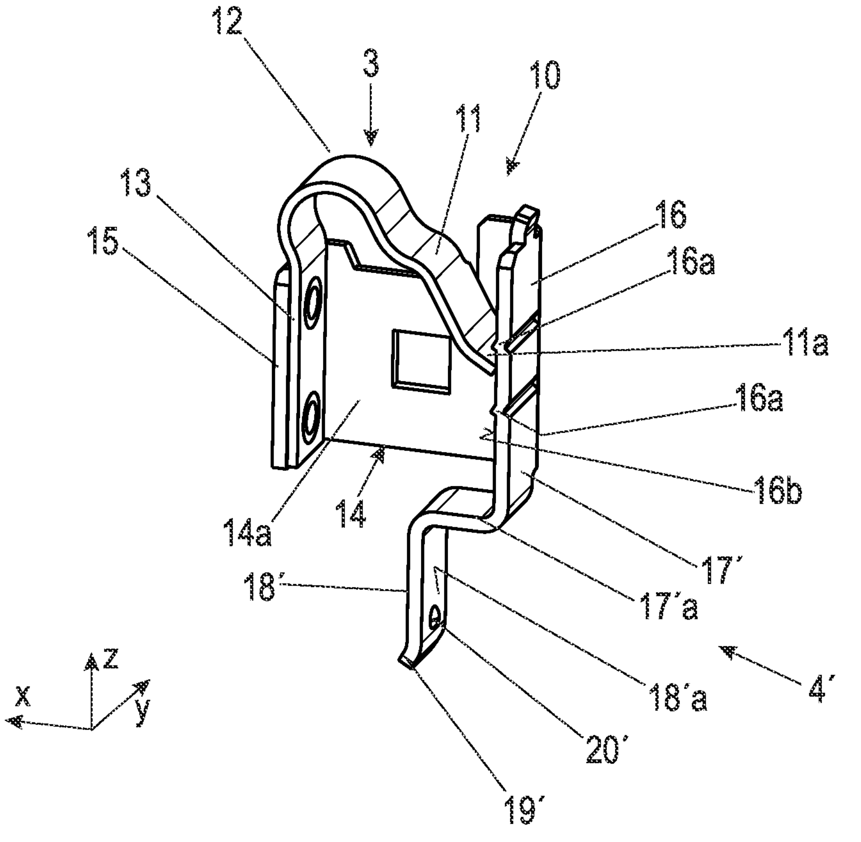
FIG. 5 is a perspective view of a second connection unit of the connector device of FIG. 1, FIGS. 6 and 7 are perspective views of the first and second connection units, respectively, of the connector device of FIG. 1.

A perspective view of a second connection unit 3 according to the invention of the connector device 1 according to FIG. 1 is shown in FIG. 5.

The spring clip 10 of the second connection unit 3 corresponds to the spring clip 10 of the first connection unit 2.

The structure of the second circuit board contact 4' is similar to that of the first circuit board contact 4 of the first connection unit 2. There are, however, differences.

In contrast to the first connection unit 2, the second circuit board contact 4' of the connection unit 3 is attached to the lower end of the second side wall 16. The second side wall 16 forms the contact wall for the spring clip 10 and simultaneously the attachment of the second circuit board contact 4'. A lower region of the second side wall 16 is connected via connection portions 17', 17'*a* to the second contact spring 18'. In other words, the second side wall 16 is lengthened by the second circuit board contact 4' in the negative z-direction below the spring clip 10.

The second circuit board contact 4' is, in this example, formed in one piece with the second side wall 16 and in one piece with the base plate 14.

The first connection portion 17' lies in the same y-z-plane of the second side wall 16 and is turned or bent up at its lower end by 90° into the x-y-plane running in the positive x-direction as a second connection portion 17'*a*. The contact spring 18' is attached to its end and runs in the positive x-direction. The lower free end of the second connection portion 17'*a* is turned or bent up into a short end portion 19' which points in the positive x-direction.

The transitions of the first connection portion 17' to the second connection portion 17'*a* and of the second connection portion 17'*a* to the second contact spring 18' extend in each case in a curve.

The contact spring 18' has a contact side 18'*a* which runs substantially parallel to the second side wall 16 and points in the positive x-direction in contrast to the first contact spring 18 of the first connection unit 2. A contact projection 20' which projects from the contact side 18'*a* is attached in a lower region of the contact spring 18'. The contact projection 20' is also formed in a nipple-like manner here.

The second contact spring 18' of the second circuit board contact 4' and the second connection portion 17'*a* are thus arranged in mirror symmetry to the first contact spring 18 of the first circuit board contact 4 of the first connection unit 2 in comparison with the representations in FIGS. 4 and 5. This mirror-symmetrical arrangement of the first circuit board contact 4 and of the second circuit board contact 4' also includes the arrangement of the first connection unit 2 and the second connection unit 3 in the receptacles 1*b*, which lie next to one another, of the housing 1*a* of the connector device 1 as shown in FIG. 1 and FIG. 6.

The second circuit board contact 4' is also designed with the connection portions 17', 17'*a* bent in relation to the second side wall 16.

Further differences of the circuit board contacts 4 and 4' are described below.

Figure 6:
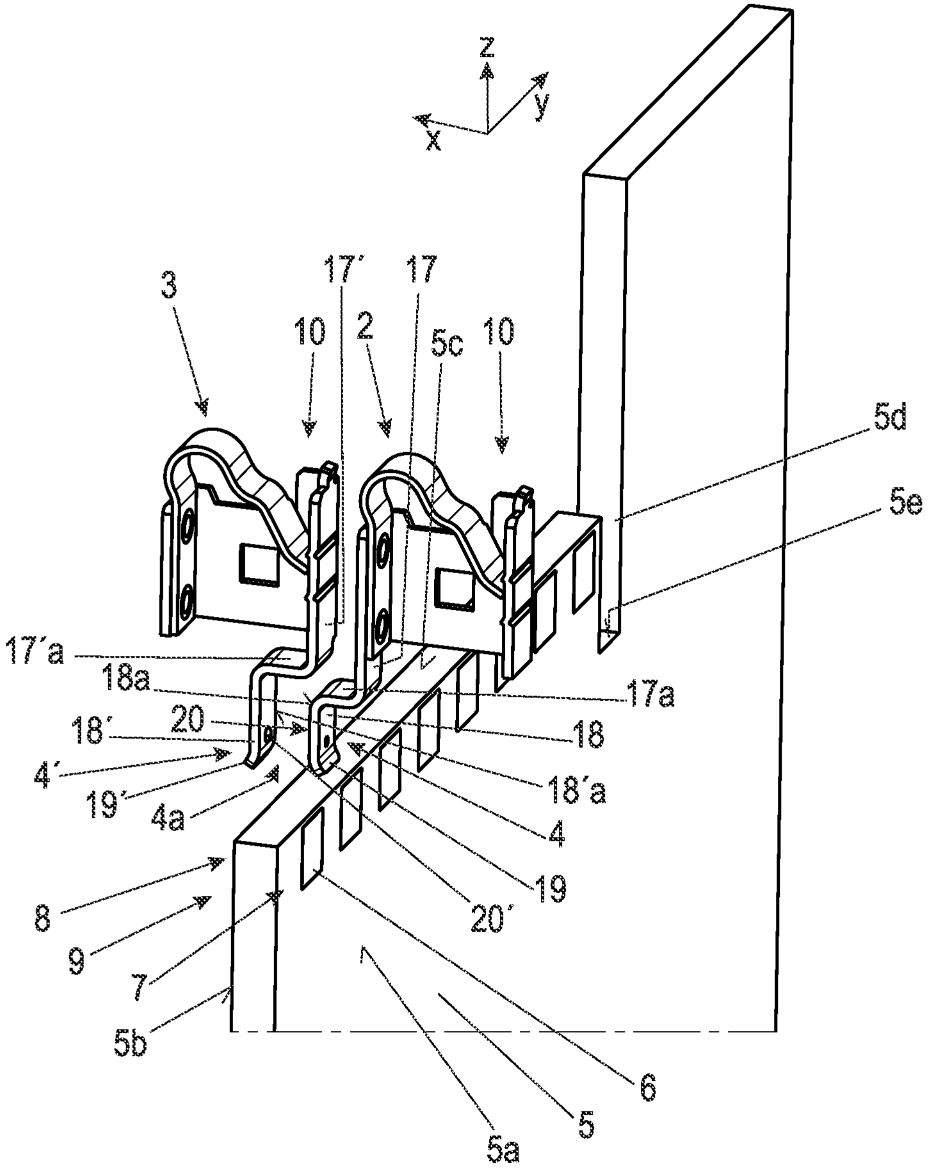
Figure 7:
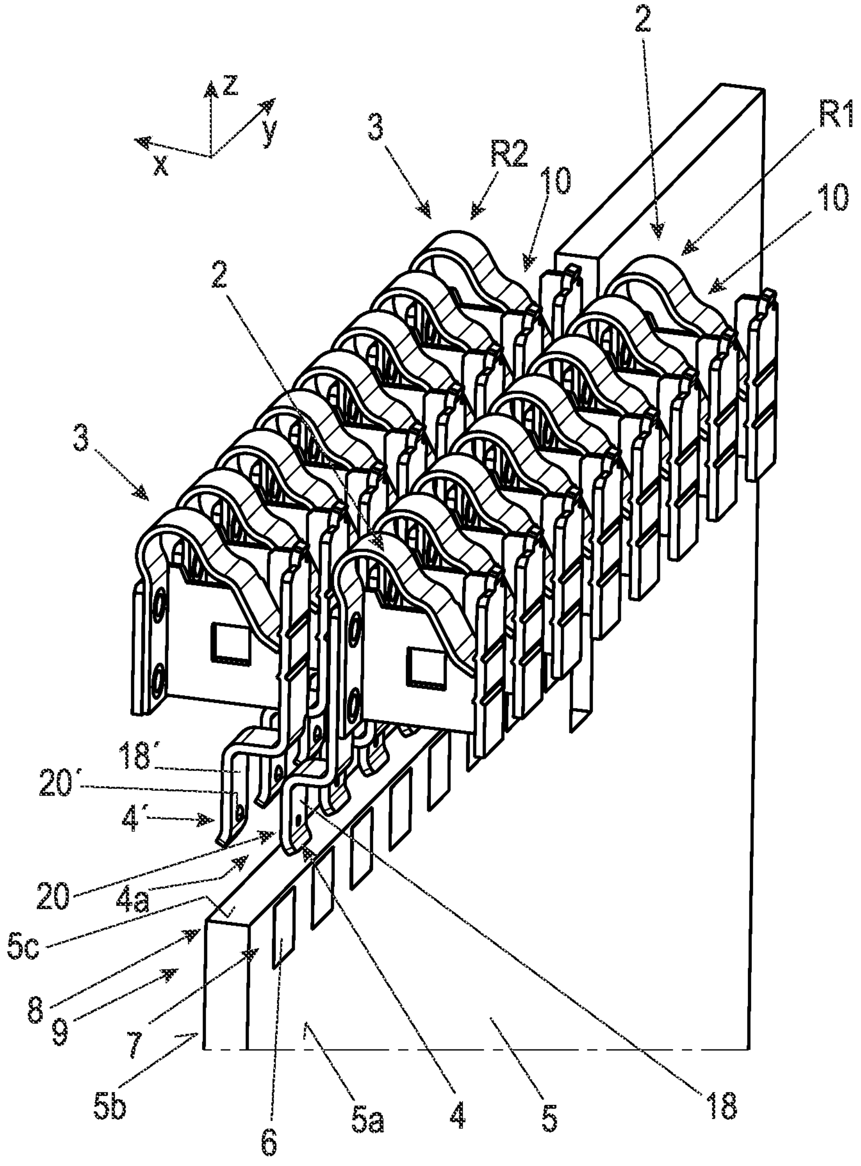

FIGS. 6 and 7 show schematic perspective views of the first and second connection units 2, 3 according to FIGS. 2 to 5 in the arrangement in the connector device 1 according to FIG. 1 without the housing 1*a* of the connector device 1.

Only the first pair of first and second connection units 2, 3 is represented in FIG. 6, with FIG. 6 showing all the connection units 2, 3 in the rows R1 and R2 of the arrangement of the connector device 1 according to FIG. 1 without the housing 1*a* of the connector device 1.

The first connection portion 17 of the first circuit board contact 4 is longer than the first connection portion 17' of the second circuit board contact 4'. The second connection portion 17*a* of the first circuit board contact 4 is furthermore shorter than the second connection portion 17'*a* of the second circuit board contact 4'. In this manner, a compact structure of both connection units 2 and 3 in the housing 1*a* of the connector device 1 is provided, wherein the circuit board contacts 4, 4' are arranged in a step-like manner.

The contact springs 18, 18' of the circuit board contacts 4 and 4' of the connection units 2 and 3 are opposite and parallel to one another at a spacing in the x-direction and thus define a lateral delimitation of the respective connector space 4*a*. The connector spaces 4*a* are furthermore delimited in the positive z-direction by the shoulder 1*g* of the central web 1*f*.

The contact projections 20, 20' of the circuit board contacts 4, 4' are also opposite one another in the connector space 4*a*.

This spacing of the contact springs 18, 18' corresponds to the thickness of the circuit board 5 (including the copper coating) plus a certain measurement. Here, this certain measurement is approximately twice the length of the projecting contact projection 20, 20' in the x-direction.

The length of the respective contact projection 20, 20' is defined as a function of the intended soldering process and its parameters. In this example, this length is 0.1 mm. This length is also the spacing of the respective contact side 18*a*, 18'*a* from the respective associated contact face 6 of the circuit board 5. This spacing is necessary for a correct soldering point, wherein the contact faces 6 are covered in advance with solder paste and/or flux or the like for the intended soldering process.

The contact geometry of the connector device 1 includes the spring contacts 4 and 4' which are opposite one another and define between them the connector space 4*a*, and the contact projections 20, 20'.

In the course of a process in which the connector device 1 is pushed in the plugging direction, i.e. in the negative z-direction, onto the connector region 9 of the circuit board 5, the bent end portions 19 of the contact springs 18, 18' facilitate a threading of the upper side 5*c* of the connector region 9 into the connector spaces 4*a*. The nipple-shaped contact projections 20, 20' of the contact springs 18, 18' then contact the associated contact faces 6 of the circuit board 5 in a respective point contacting. This provides the advantage that the flux or solder paste located on the contact faces 6 is not removed or pushed away, apart from in the region of contacting of the contact projection 20, 20'. This advantage also arises if the contact projection 20, 20' is formed in a linear manner and extending in the z-direction. Several point contacts can also be provided consecutively in a row extending in the z-direction as contact projections 20, 20'. Moreover, a uniform spacing, distributed over the contact faces 6, to the contact springs 18, 18' of the circuit board contacts 4, 4' for the intended soldering process can be abided by and enable accurate soldering points.

The contact springs 18, 18' are furthermore under slight pretensioning to one another in the x-direction and are under slightly more tension when the connector device 1 is pushed onto the connector region 9 of the circuit board 5. This pretensioning force has the further advantage that the connector device 1 is fixed in its position on the circuit board 5 to such an extent that it cannot be displaced during the soldering process.

In FIG. 6, the connector region 9 with the upper side 5*c* of the edge of the circuit board 5 (here on one side in the positive y-direction) is delimited by a slot 5*d* which has a base 5*e*. This slot 5*d* serves to fix the connector device 1 in a connection position. By this fixing which is explained by way of example in greater detail in conjunction with FIG. 8, it is possible that the circuit board contacts 4, 4' of the connector device 1 can be positioned in a precise manner protected against polarity reversal in relation to the associated contact faces 6 of the circuit board 5.

Figure 8:
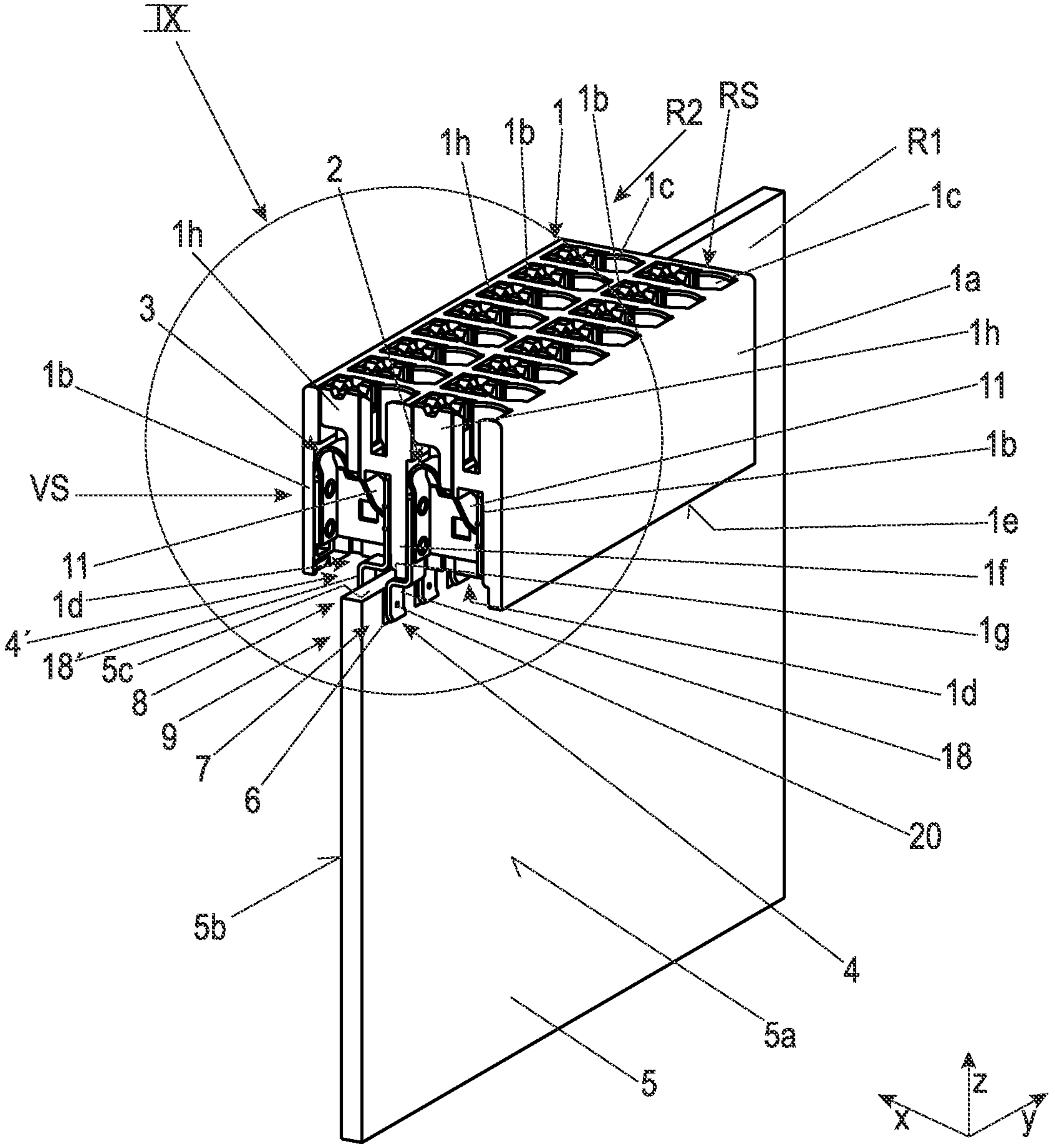
FIG. 8 is a perspective view of the connector device of FIG. 1 in a connection position.
Figure 9:
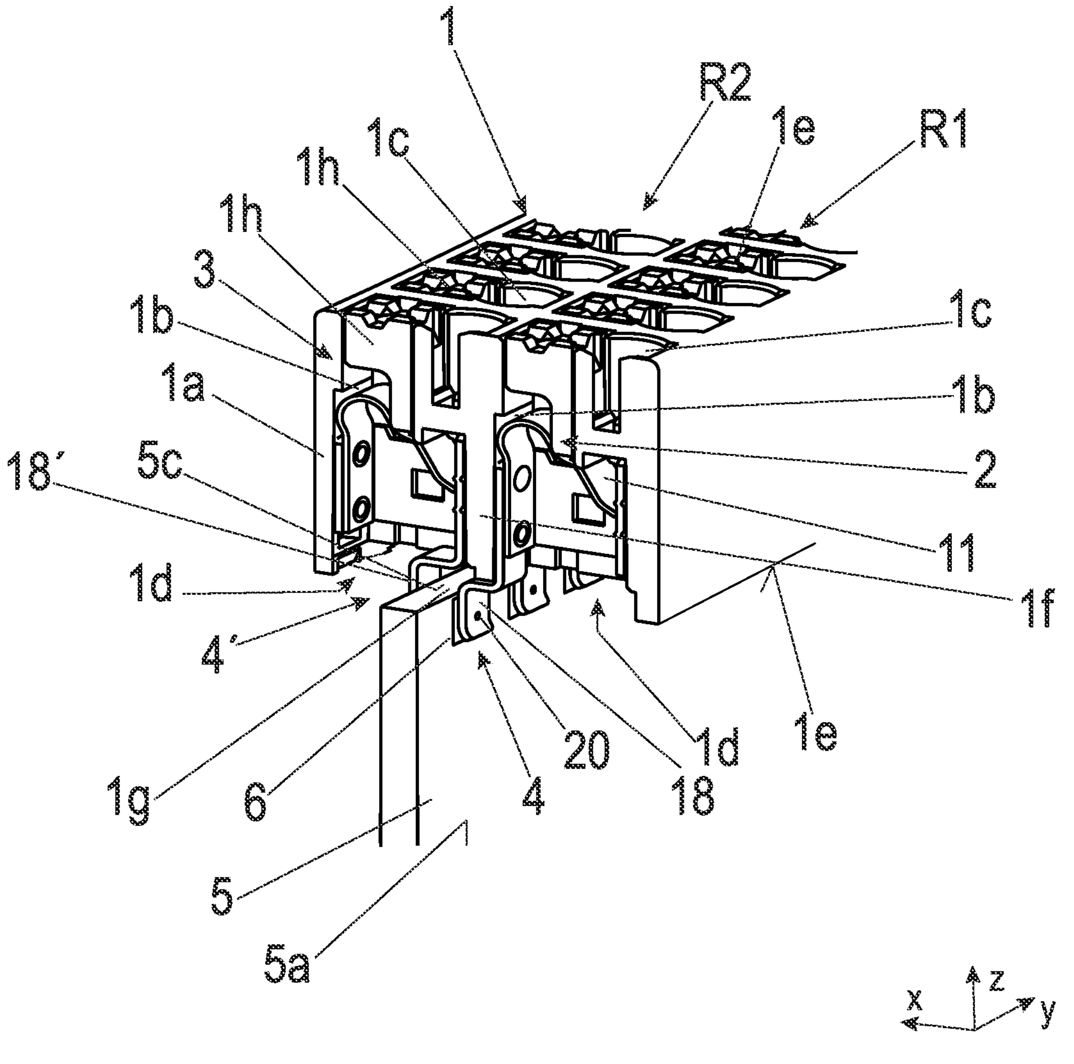
FIG. 9 is detailed view of the connector of FIG. 8 taken along line IX.

FIG. 8 is a perspective view of the connector device 1 according to FIG. 1 in a connection position. FIG. 9 is an enlarged representation of the region IX from FIG. 8.

In the connection position, the upper side 5*c* of the edge of the circuit board 5 is in contact with the shoulder 1*g* of the central web 1*f* of the housing 1*a* of the connector device 1. The shoulder 1*g* of the central web 1*f* runs in the y-direction. A stop of the connector device 1 on the circuit board 5 in the negative z-direction is thus formed.

It is furthermore apparent in FIG. 8 that the cranked circuit board contacts 4, 4' have the advantage that the connector space 4*a* can be arranged so that the upper side 5*c* of the circuit board 5 lies below the shoulder 1*g* of the central web 1*f* of the housing 1*a* of the connector device 1.

A lower side of the rear side wall RS of the housing 1*a* of the connector device 1 lies on the base 5*e* of the slot 5*d* (FIG. 6) of the edge of the circuit board 5 in the connection position. An additional stop in the negative z-direction is thus formed, wherein a fixing of the connector device 1 in the y-direction is simultaneously ensured by form fitting of the rear side wall RS with the slot 5*d* of the circuit board 5 as shown in FIG. 6.

Once the connector device 1, in the connection position, is connected to the associated circuit board 5 by the intended soldering process, the connector device 1 connects the conductors L connected to it by the associated connection units 2, 3 via the spring clips 10 and the circuit board contacts 4, 4' to the associated contact faces 6 of the circuit board 5.

The conductors L are received by the first openings 1*c* of the upper side of the housing 1*a* of the connector device 1 in a manner that they are received and are guided into the respective connector spaces 10*a* of the spring clip 10 of the connection units 2, 3 and clamped by the spring arm 11 of the respective spring clip 10 onto the contact side 16*b* of the second side wall 16. For this purpose, the spring arm 11 of the spring clamp 10 was previously pushed by an actuator 1*h* downwardly in the z-direction in order to facilitate a pushing-in of the respective conductor L into the connector space 10*a*. It is also possible that the conductor L can be pushed into the spring clip 10 without pushing the actuator 1*h*.

After release of the actuator 1*h*, the contact edge 11*a* of the spring arm 11 pushes the conductor L against the contact projections 16*a* and the contact side 16*b* of the second side wall 16.

An electrically conducting connection of the conductor L and of the circuit board contact 4, 4' is produced in this manner between the spring clip 10 and the respective circuit board contact 4, 4' by the electrically conducting base plate 14 of the connection unit 2, 3, to which both the spring clip 10 and also the respective circuit board contact 4, 4' are connected in an electrically conducting manner.

The invention is not restricted to the exemplary embodiments explained above.

What is claimed is:

1. A connector device for connecting at least one electrical conductor to at least one electrically conducting contact face of a circuit board, comprising:

(a) a housing;

(b) at least one first connection unit incorporating surface mounting device capability including at least one first circuit board contact comprising a first spring arm arranged in said housing and a first contact projection on a portion of said first spring arm; and (c) at least one second connection unit incorporating surface mounting device capability including at least one second circuit board contact comprising a second spring arm arranged in said housing and a second contact projection on a portion of said second spring arm, wherein the connector device has a surface mounting device capable contact geometry and said first and second contact projections each form at least one point contact.

2. The connector device according to claim 1, wherein said first and second contact projections each form a line contact which extends in a plugging direction of the connector device.

3. The connector device according to claim 1, wherein said at least one first and second circuit board contacts are arranged opposite one another to define between them a connector space for receiving a connector region of the circuit board.

4. The connector device according to claim 3, wherein said connector space is further defined by a central web of said housing.

5. The connector device according to claim 1, wherein said housing contains at least one receptacle within which at least one of said first and second connection units are inserted, respectively, each receptacle including at least one first opening on an upper side of said housing for an electrical conductor and at least one second opening on an under side of said housing through which said spring arm of a respective circuit board contact extends.

6. The connector device according to claim 1, wherein said first spring arm of said first circuit board contact is attached to a first side wall of said at least one first connection unit and said second spring arm of said second circuit board contact is attached to a second side wall of said at least one second connection unit.

7. The connector device according to claim 6, wherein said at least one first connection unit and said at least one second connection unit are arranged in adjacent receptacles with a central web of said housing arranged between said first side wall of said at least one first connection unit with said first spring arm of said first circuit board contact and said second side wall of said at least one second connection unit with said second spring arm of said second circuit board contact.

8. The connector device according to claim 7, wherein said at least one first connection unit and said at least one second connection unit each have a base plate with said first side wall and with said second side wall, and further wherein said first side wall and said second side wall are attached parallel to one another and at a right angle to said base plate and are connected in an electrically conducting manner through said base plate.

9. The connector device according to claim 8, wherein said at least one first connection unit and said at least one second connection unit each have a spring clip for connecting said at least one electrical conductor, respectively, and further wherein said spring clip includes a spring arm having a contact edge and a contact wall which comprises said second side wall.

10. The connector device according to claim 9, wherein said spring arm of said spring clip is connected via a curved portion to a fastening portion which is attached to said first side wall of said base plate in an electrically conducting manner.

11. The connector device according to claim 10, wherein said housing includes an actuator assembly for actuating said spring clip of a respective connection unit.

12. A connection unit of a connector device according to claim 1 comprising;

a base plate, a first side wall, and a second side wall, said first side wall and said second side wall being attached parallel to one another and at a right angle to said base plate and being connected in an electrically conducting manner through said base plate.

13. The connection unit according to claim 12, and further comprising a spring clip including a spring arm having a contact edge and a contact wall, said contact wall comprising said second side wall, and wherein said spring arm of said spring clip is connected via a curved portion to a fastening portion which is attached to said first side wall of said base plate in an electrically conducting manner.

14. The connection unit according to claim 13, wherein said spring arm of said circuit board contact is attached to said first side wall of said connection unit, whereby said first side wall is lengthened by said circuit board contact below said spring clip.

15. The connection unit according to claim 14, wherein said circuit board contacts of said connection units are designed with bent connection portions.

16. The connection unit according to claim 13, wherein said spring arm of said circuit board contact is attached to said second side wall of said connection unit, whereby said second side wall is lengthened by said circuit board contact below said spring clip.

* * * * *